US012671503B1

(12) United States Patent
Sunami

(10) Patent No.: US 12,671,503 B1
(45) Date of Patent: Jun. 30, 2026

(54) QUANTUM SYSTEM WITH AN OPTICAL CAVITY AND OPTICAL ROUTER

(71) Applicant: Nanofiber Quantum Technologies, Inc., Tokyo (JP)

(72) Inventor: Shinichi Sunami, Tokyo (JP)

(73) Assignee: Nanofiber Quantum Technologies, Inc., Tokyo (JP)

( * ) Notice: Subject to any disclaimer, the term of this patent is extended or adjusted under 35 U.S.C. 154(b) by 299 days.

(21) Appl. No.: 18/599,857

(22) Filed: Mar. 8, 2024

(51) Int. Cl.
*H04B 10/70* (2013.01)
*G06N 10/40* (2022.01)

(52) U.S. Cl.
CPC ............. *H04B 10/70* (2013.01); *G06N 10/40* (2022.01)

(58) Field of Classification Search
CPC .................................. H04B 10/70; G06N 10/40
See application file for complete search history.

(56) References Cited

U.S. PATENT DOCUMENTS

2023/0204863 A1* 6/2023 Aoki .................... G02B 6/2713
385/30

FOREIGN PATENT DOCUMENTS

| JP | 2016153850 A | 8/2016 |
| JP | 2023055195 | 3/2020 |
| WO | 2022009950 A1 | 1/2022 |

OTHER PUBLICATIONS

Daiss et al, "A Quantum-Logic Gate between Distant Quantum-Network Modules" (published at https://arxiv.org/abs/2103.13095, Mar. 2021).*
Lagenfield et al, "A network-ready random-access qubits memory" (published at https://arxiv.org/pdf/2011.00811, Nov. 2020).*
C.-L. Hung et al. "Quantum spin dynamics with pairwise-tunable, long-range interactions", PNAS, Aug. 5, 2016, pp. E4946-E4955, 113 (34), www.pnas.org/cgi/doi/10.1073/pnas.1603777113.
L.-M. Duan et al. "Robust quantum gates on neutral atoms with cavity-assisted photon scattering", The American Physical Society, Sep. 28, 2005, pp. 032333-1-032333-4, 72, DOI: 10.1103/PhysRevA.72.032333.
L.-M. Duan et al. "Scalable Photonic Quantum Computation through Cavity-Assisted Interactions", The American Physical Society, Mar. 26, 2004, pp. 127902-1-127902-4, vol. 92, No. 12, DOI: 10.1103/PhysRevLett.92.127902.
H. J. Briegel et al. "Quantum Repeaters: The Role of Imperfect Local Operations in Quantum Communication", The American Physical Society, Dec. 28, 1998, vol. 81, No. 26, pp. 5932-5935.

(Continued)

*Primary Examiner* — Casey L Kretzer
(74) *Attorney, Agent, or Firm* — Ogawa P.C.

(57) ABSTRACT

In an example, the present invention provides a quantum communication system. The system has a light source configured to generate a pulse of light and a plurality of optical cavities. In an example, each of the optical cavities has at least a pair of optical mirrors to form a cavity. In an example, each cavity has a plurality of qubits comprising a laser coolable atom. Each cavity has an interconnect coupled to the cavity. In an example, the system has an optical router coupled to the light source coupled to each of the cavities through the interconnect. In an example, the optical router is configured to transmit the pulse of light to any one of the plurality of optical cavities or receive a reflected pulse of light from any one of the plurality of optical cavities and transmit the reflected pulse.

17 Claims, 5 Drawing Sheets

(56)             References Cited

OTHER PUBLICATIONS

Daniel Gottesman et al., "Encoding a qubit in an oscillator", May 13, 2001, pp. 1-22, arXiv:quant-ph/0008040v3.

Jacob Hastrup et al., "Generation of optical Gottesman-Kitaev-Preskill states with cavity QED", Jul. 5, 2021, pp. 1-14, arXiv:2104.07981v2 [quant-ph].

Arne L. Grimsmo et al., "Quantum Computing with Rotation-Symmetric Bosonic Codes", American Physical Society, Physical Review X 10, Mar. 6, 2020, pp. 1-32, DOI: 10.1103/PhysRevX.10.011058.

E. Knill, "Quantum Computing with Very Noisy Devices", Nov. 2, 2004, pp. 1-47, arXiv:quant-ph/0410199v2.

Kyungjoo Noh et al., "Low-Overhead Fault-Tolerant Quantum Error Correction with the Surface-GKP Code", American Physical Society, PRX Quantum 3, Jan. 28, 2022, pp. 1-43, DOI: 10.1103/PRXQuantum.3.010315.

Thomas J. Bell et al., "Optimizing Graph Codes for Measurement-Based Loss Tolerance", American Physical Society, Prx Quantum 4, May 17, 2023, pp. 1-20, DOI: 10.1103/PRXQuantum.4.020328.

Kah Jen Wo et al., "Resource-efficient fault-tolerant one-way quantum repeater with code concatenation", Oct. 10, 2023, pp. 1-25, arXiv:2306.07224v3 [quant-ph].

* cited by examiner

QUANTUM SYSTEM WITH AN OPTICAL CAVITY AND OPTICAL ROUTER

BACKGROUND OF INVENTION

The present invention relates generally to distributed quantum computing and quantum repeater techniques. In particular, the present invention provides method including an optical router for a quantum computing device. Merely by way of example, the invention can be applied to a variety of applications such as secure communication, cryptography, drug discovery, optimization, machine learning and artificial intelligence, finance, weather forecasting, materials, and any other complex human or non-human matters.

Quantum computing is a type of computing that utilizes quantum mechanics to perform certain tasks more efficiently than classical computing. Quantum mechanical effects such as entanglement allow quantum computers to perform certain calculations exponentially faster than classical computers, such as factorization of large numbers, optimization problems, and simulations of quantum systems. Similarly, quantum communication utilizes quantum mechanical effects to perform certain communication tasks with improved security.

However, both quantum computing and quantum repeater also have some drawbacks. One major challenge is that photons are highly susceptible to loss and dephasing, which can cause errors in the photon-assisted distributed quantum computation and quantum repeater operations. Therefore, quantum computers and repeaters require careful error detection and correction techniques to maintain the accuracy of the communication by precise control and detection of individual quantum systems on demand. However, generating loss-tolerant photonic pulse often require large overhead.

From the above, it is seen that techniques for improving scalability of error-corrected quantum computing and quantum communications are desired.

SUMMARY OF INVENTION

According to the present invention, techniques generally related to quantum computing and quantum repeater are provided. In particular, the present invention provides an optical tweezer system and method including high resolution imaging system for trapping and controlling atoms and a pair of reflectors to enable an optical cavity for a quantum computing and repeater device. Merely by way of example, the invention can be applied to a variety of applications such as cryptography, drug discovery, optimization, machine learning and artificial intelligence, finance, weather forecasting, chemical, mechanical, electrical, civil, nuclear fusion and fission, economics, materials, and any other complex human or non-human matters.

In an example, the present invention provides a quantum communication system. The system has a light source configured to generate a pulse of light and a plurality of optical cavities. In an example, each of the optical cavities has at least a pair of optical mirrors characterized by a mirror reflectivity >99% and reflecting surface facing each other to form a cavity. In an example, the cavity has a length ranging from 1 micrometer to 1 centimeter or longer. In an example, each cavity has a one or plurality of qubits comprising a laser coolable atom, ion, nitrogen vacancy center, silicon color center or other qubit systems with optical control capabilities, such that a number of the qubits range from one to 100,000. Each cavity has an interconnect coupled to the cavity. In an example, the system has an optical router coupled to the light source coupled to each of the cavities through the interconnect. In an example, the optical router is configured to transmit the pulse of light to any one of the plurality of optical cavities or receive a reflected pulse of light from any one of the plurality of optical cavities and transmit the reflected pulse. In an example, the system has a beam splitter coupled to the optical router to receive the reflected light and configured to output the reflected light to an output port.

Depending upon the example, the present invention can achieve one or more of these benefits and/or advantages. In an example, the present invention provides a quantum repeater device that performs error-corrected operations in a modular and a scalable manner. In an example, the device uses conventional optical techniques, and operates at room temperature. In an example, the present invention offers advantages of generating outputs that are reliable and efficient. These and other benefits and/or advantages are achievable with the present device and related methods. Further details of these benefits and/or advantages can be found throughout the present specification and more particularly below.

BRIEF DESCRIPTION OF FIGURES

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE EXAMPLES

Figure 1:
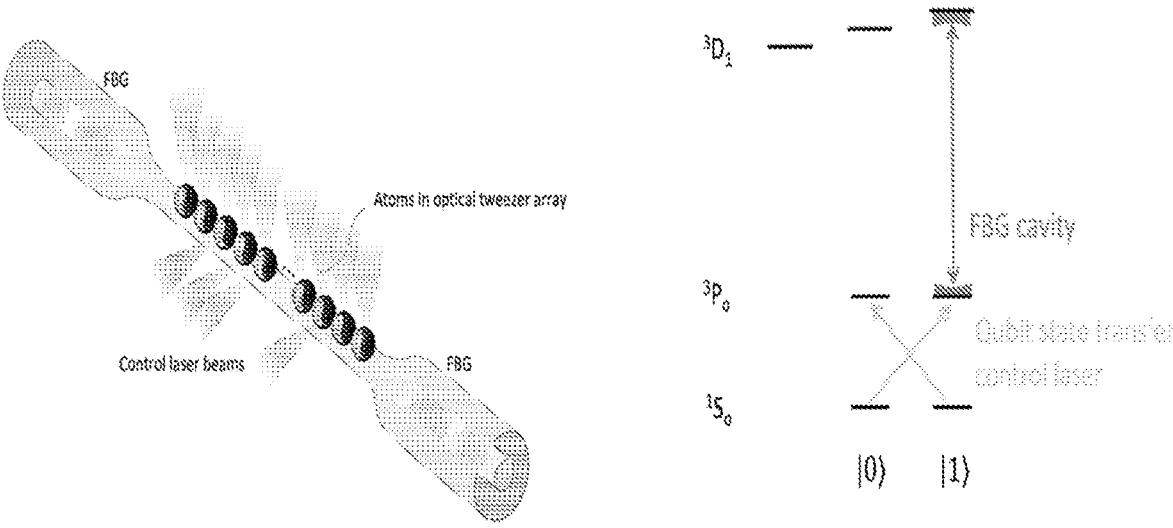
FIG. 1 is a simplified diagram illustrating a quantum cell system according to an example of the present invention according to an example of the present invention.
Figure 1:
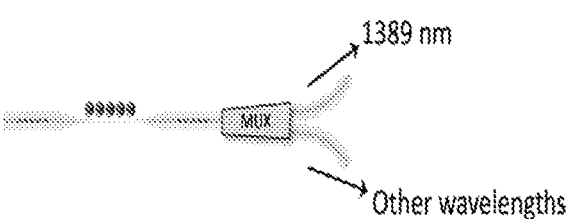

According to the present invention, techniques generally related to quantum computing and quantum repeater are provided. In particular, the present invention provides an optical router for a distributed quantum computing and repeater device. Merely by way of example, the invention can be applied to a variety of applications such as cryptography, drug discovery, optimization, machine learning and artificial intelligence, finance, weather forecasting, chemical, mechanical, electrical, civil, nuclear fusion and fission, economics, materials, and any other complex human or non-human matters.

In an example, the present invention provides a quantum communication system. The system has a light source configured to generate a pulse of light and a plurality of optical cavities. In an example, each of the optical cavities has at least a pair of optical mirrors characterized by a mirror reflectivity >99% and reflecting surface facing each other to form a cavity. In an example, the cavity has a length ranging from 1 micrometer to 1 centimeter or longer. In an example, each cavity has a one or plurality of qubits comprising a laser coolable atom, ion, nitrogen vacancy center, silicon color center or other qubit systems with optical control capabilities, such that a number of the qubits range from one to 100,000. Each cavity has an interconnect coupled to the cavity. In an example, the system has an optical router coupled to the light source coupled to each of the cavities through the interconnect. In an example, the optical router is configured to transmit the pulse of light to any one of the plurality of optical cavities or receive a reflected pulse of light from any one of the plurality of optical cavities and transmit the reflected pulse. In an example, the system has a beam splitter coupled to the optical router to receive the reflected light and configured to output the reflected light to an output port.

In an example, the beam splitter is configured to receive an input light pulse and a generated pulse of light to displace a phase space distribution of the input light pulse.

In an example, each of the plurality of optical cavities further comprising a plurality of electrical coil pairs to control the magnetic field and magnetic field gradient at the location of the qubits and a detection system operably coupled to the cavity region configured to collect one or more fluorescence photons to be sent to a camera or a detector with a quantum efficiency of 0.1 or higher.

In an example, the system has a computing system comprising an information processing unit configured to process a recorded qubit state information captured from the camera or the detector and configured to identify a quantum state of the one or more qubits.

In an example, the computing system is configured to decode using the information processing unit a quantum error information from measurement results.

In an example, the pair of optical mirrors is selected from a free-space bulk mirror, a fiber-based mirror, or a fiber Bragg grating mirrors.

In an example, a one or more qubits are coupled to a cavity mode between the two free-space bulk mirrors or a fiber-based mirrors.

In an example, one or more qubits are evanescently coupled to a cavity mode between the two optical mirrors at a nanofiber region. In an example, the nanofiber region is configured from a portion of a fiber optic cable and coupled between a first fiber Bragg grating mirror and a second fiber Bragg grating mirror, the nanofiber region having a transmission of 99% and greater. In an example, the nanofiber region has a diameter ranging from 300 nanometer to 1.5 micrometer. In an example, the nanofiber region ranges from 10 micrometer to 10 centimeter in length.

In an example, the optical interconnect is coupled to one or more of a single-photon generator, a photon detector, a network comprising of one or more optical cavities, a single-photon source, a semiconductor single-photon emitter, an optical router, an optical switch, a circulators, a photon detector, a polarization beam splitter, a coherent light source, a squeezed light source, or an optical homodyne and heterodyne detector, among other devices.

In an example, the system has a communication input port coupled to the optical router.

In an example, the system has a communication output port coupled to a feedforward displacement operation such that a communication output light pulse represents a same encoded state of a light pulse received at the communication input port with a reduced error.

Further details of the system are provided throughout the present specification and more particularly below.

FIG. 1 is a simplified diagram illustrating a quantum repeater cell system according to an example of the present invention. As shown, the system has one or more optical cavity made of two fiber-Bragg grating (FBG) mirrors, both having reflectivity of 90% or above and may have different reflectivity. The material between the two FBGs can be tapered nanofiber, nanophotonic structure, or any other optical waveguide systems which allows strong coupling of the electric field with the atom trapped in the optical tweezer array or any cold atom trapping system near the waveguide.

In addition, a plurality of focused laser beams are addressed to individual atoms to control the internal states. The laser beams are typically tuned to the wavelengths of the atomic transitions or be detuned from transitions by a megahertz or more. DC, microwave and radiofrequency fields may be generated by microwave horn antennas, electrical coils, near-field chip antenna, or any other methods to create the oscillating or static magnetic field.

One or more objective lenses are located near the cavity region to focus the control laser beams as well as to collect fluorescence photons to be directed to a high quantum efficiency camera, to identify the state of the atoms.

The cavity is coupled to a wavelength multiplexer (MUX) device that is configured to change two or more photons in one spatial modes into two or more photons in a two or more spatial modes, typically the propagating mode in single-mode fiber.

Figure 2:
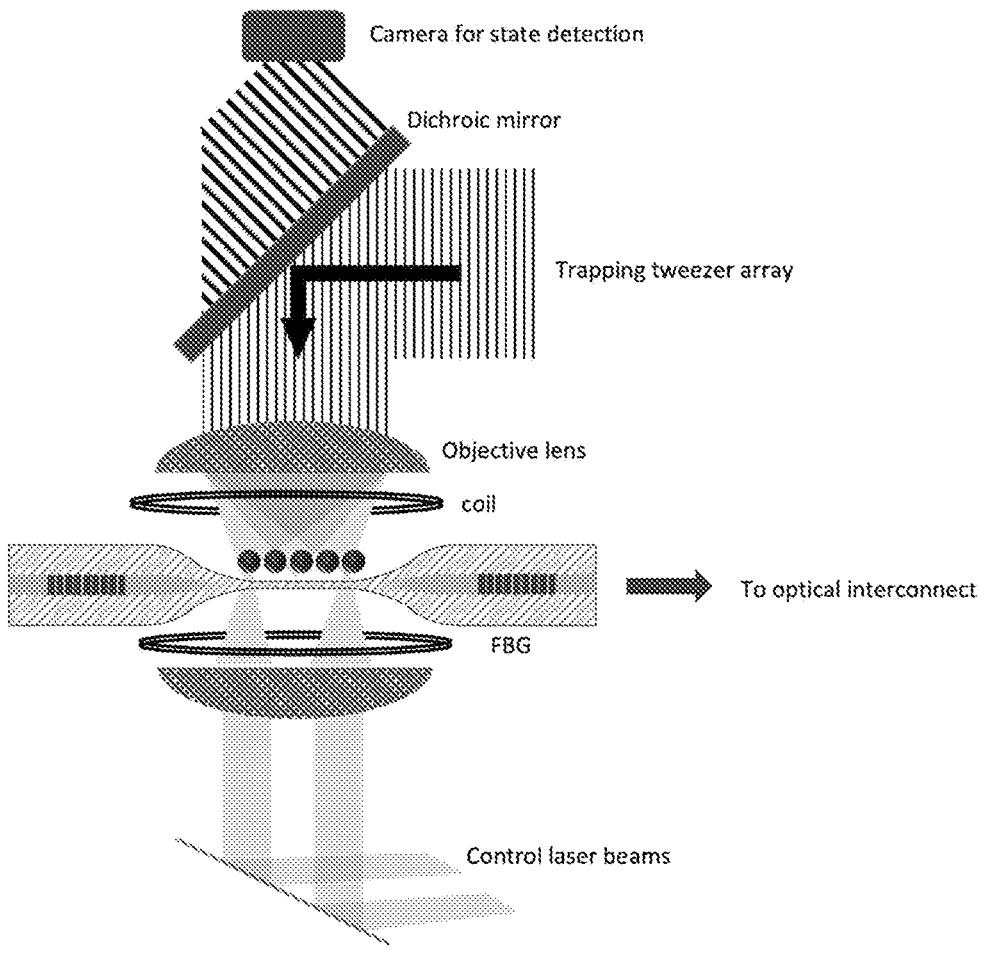
FIG. 2 is a more detailed diagram illustrating a quantum repeater cell device according to an example of the present invention.

FIG. 2 is a simplified diagram illustrating the cavity region of the quantum computing cell device according to an example of the present invention. Two objective lenses are located above and below the optical cavity, such that the field of view covers the mode volume of the cavity. One objective lens is used to focus an array of optical tweezers, coupled by a dichroic mirror with a high-resolution imaging system comprising of high quantum efficiency camera, along with addressable control laser beam to control the quantum state of the atom qubits. The other objective lens is used to focus an array of laser beams addressing each tweezer site, with individual frequency control. In addition, optical interconnect with other cavities and single-photon generators and detectors are included. A network comprises of optical cavities (identical ones), single-photon sources (similar cavity quantum electrodynamics, QED, system, semiconductor single-photon emitter, nitrogen vacancy (NV) center, ion trap), optical fiber, optical router (optical switches), photon detector, polarization beam splitter and other optical components.

Figure 3:
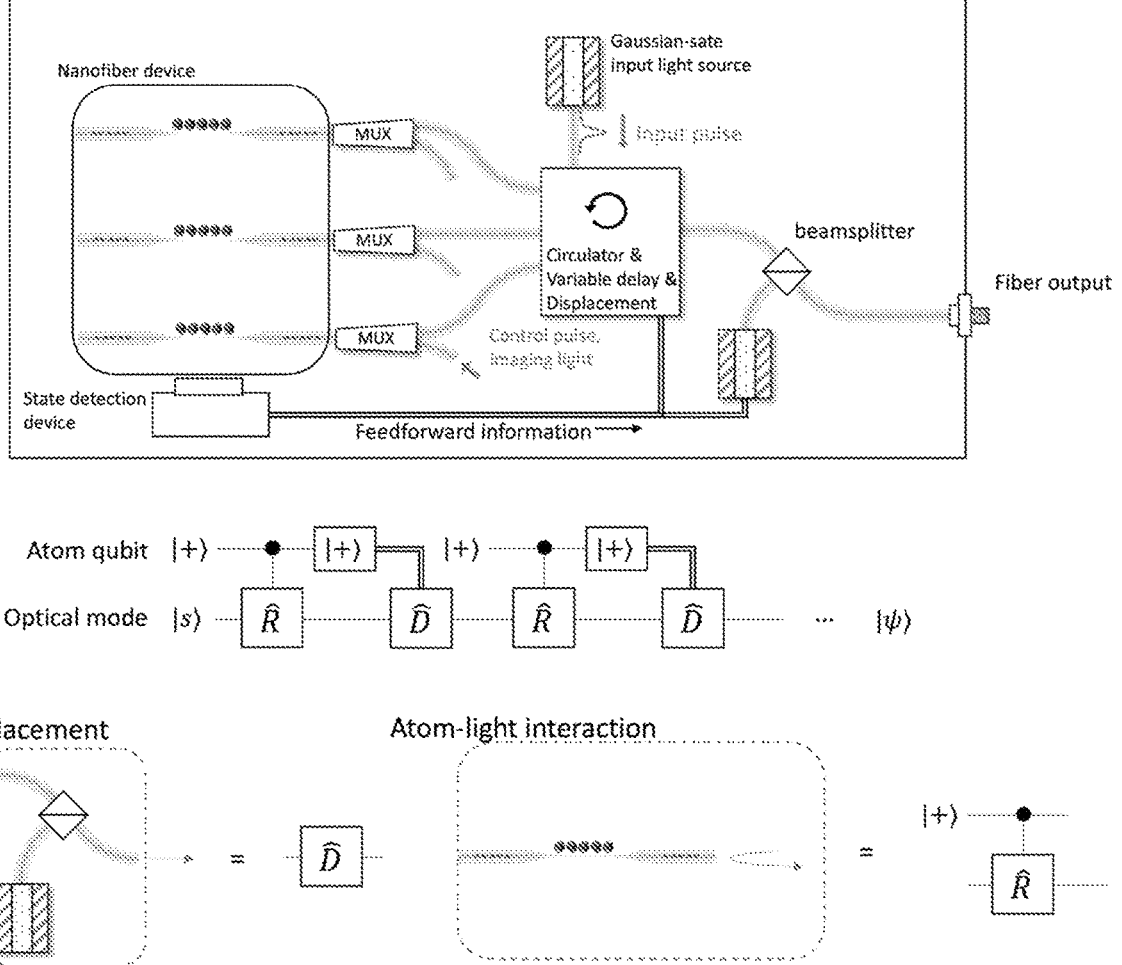
FIG. 3 is a simplified diagram illustrating light pulse generation device according to an example.

FIG. 3 is the simplified illustration of the non-gaussian state generation device. The device has internal optical network to generate entangled photons. The network consists of one or more optical cavities, optical router, gaussian-state light pulse generator including coherent and squeezed states, photon counter, homodyne light detector, optical circulator, variable optical delay line, beam splitters and polarization beam splitters.

As illustrated in FIG. 1, one or more atoms are trapped near the cavity such that the atoms are coupled to the optical cavity mode. Objective lenses, image capture device and classical processing unit are used to detect the state of the atoms. Alternatively, the wavelength multiplexer inputs are used to measure the state of atoms by measuring the transmission of light at or near the atomic transition wavelength, through the waveguide.

The quantum circuit diagram in the middle illustrates the non-gaussian state generation procedure. The initial light pulse, the squeezed state |s>, is first displaced by the displacement operation D. The light mode then interacts with the atom qubit in the cavity by being reflected from the input mirror. Following the interaction, the atom qubit is measured, and depending on the measured atom state basis, further light mode displacement operation is performed. The atom interaction, measurement and displacement are repeated for one or more times to obtain the non-gaussian state desired. The non-gaussian state generated includes the Gottesman-Kitaev-Preskill states [1,2] or the rotationally symmetric states [3].

Figure 4:
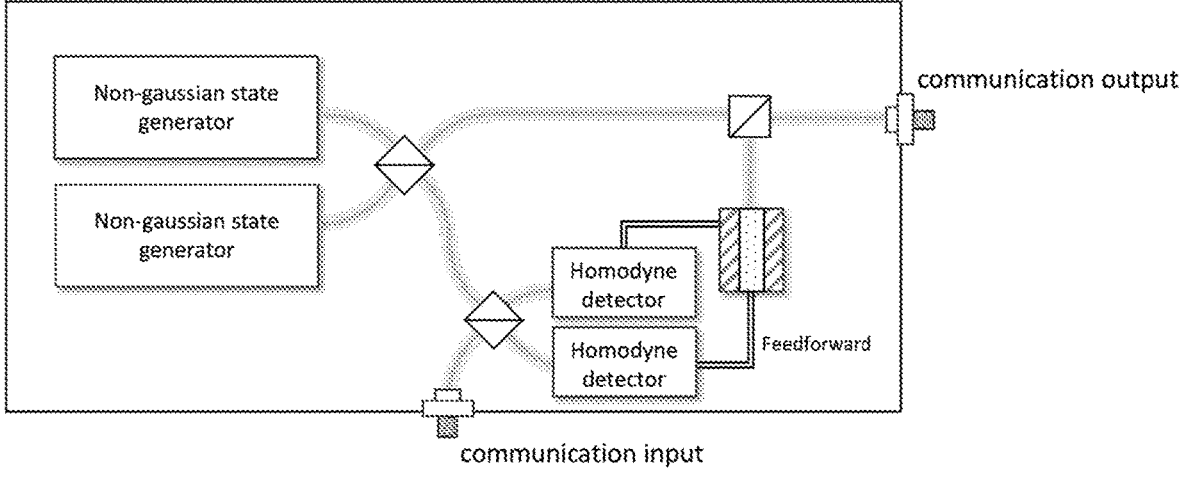
FIG. 4 is a simplified diagram illustrating quantum communication device with single input and output ports according to an example.
Figure 4:
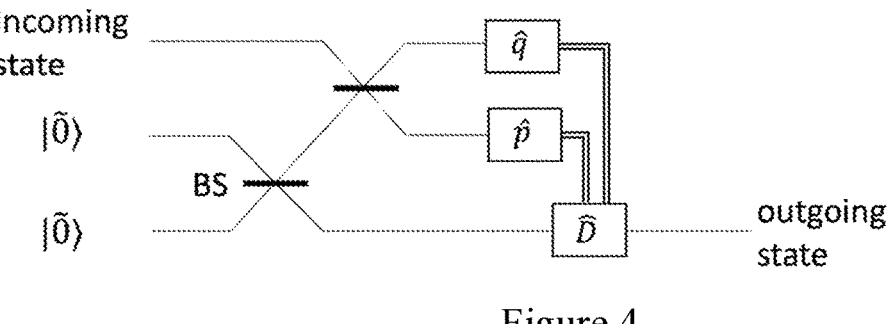

FIG. 4 is an illustration of quantum repeater device based on the non-gaussian state generation, entanglement and measurement. The device consists of the non-Gaussian state generation device illustrated in FIG. 3 with additional fiber-optic input, beam splitter and feedforward displacement device.

The interference of the new non-gaussian state and the incoming non-gaussian state at the beam splitter induces entanglement between the two states, where the measurement of the incoming light after the entanglement operation with homodyne detector identifies the presence of error in the incoming state, some of which can be corrected by the feedforward displacement operation [4,5].

Figure 5:
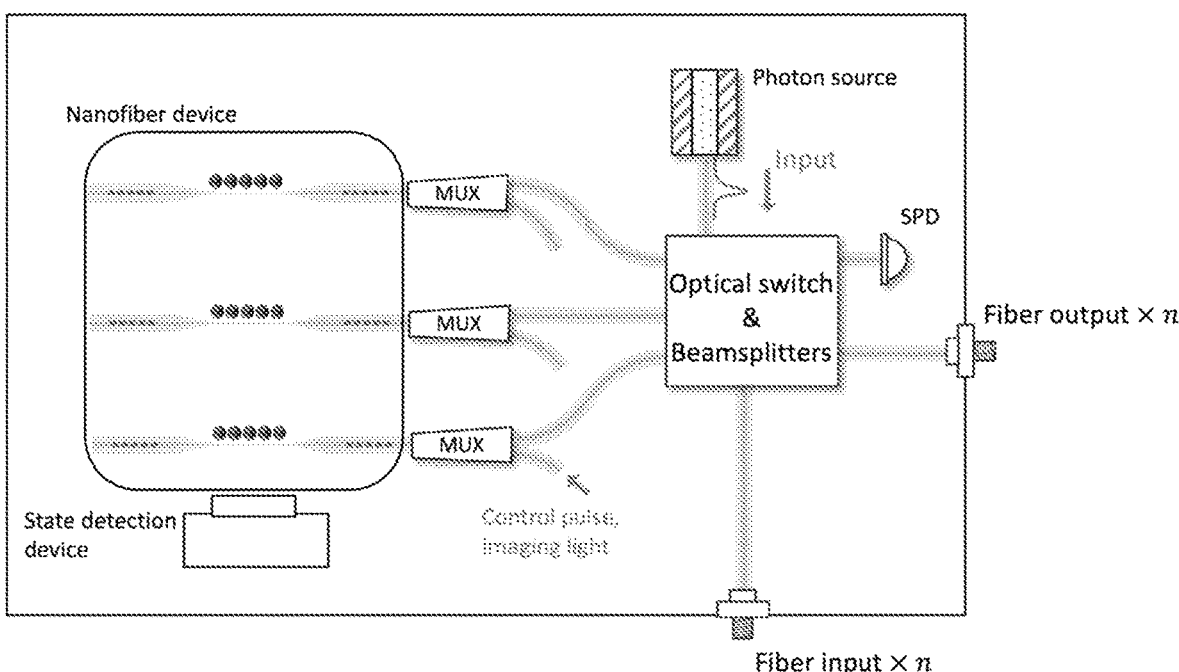
FIG. 5 is a simplified diagram illustrating quantum communication device with multiple input and output ports according to an example.

FIG. 5 is a quantum communication device based on the repeater cell system illustrated in FIG. 1. The communication device comprises of multiple fiber input ports, optical routing module including beam splitters, cavity devices illustrated in FIG. 1, photon generation devices and photon detection devices. The device further comprises one or more fiber output ports. This communication device is designed to transmit the quantum communication in the form of discrete-variable information qudits (including qubits), where the integer number of states |0>, |1>, . . . |N> and their linear combinations represent the state to be transmitted.

The communication device of FIG. 5 can be used to generate multi-qudit entangled state to perform loss-tolerant quantum communication such as the graph-code quantum communication [6]. The generated multi-qudit state can be further entangled to the state of the atom qubits in the cavity, such that the quantum repeater operations can be performed, including the entanglement swapping [7].

In an example, the system has a quantum communication system. In an example, the system has a light source configured to generate a pulse of light and a plurality of optical cavities. In an example, each of the optical cavities has at least a pair of optical mirrors characterized by a mirror reflectivity >99% and reflecting surface facing each other to form a cavity, the cavity having a length ranging from 1 micrometer to 1 centimeter or longer. In an example, each cavity has a plurality of qubits comprising a laser coolable atom, ion, nitrogen vacancy center, silicon color center or other qubit systems with optical control capabilities, such that a number of the qubits range from one to 100,000. In an example, each cavity has an interconnect coupled to the cavity.

In an example the system has an optical router coupled to the light source coupled to each of the cavities through the interconnect. In an example, the optical router is configured to transmit the pulse of light to any one of the plurality of optical cavities or receive a reflected pulse of light from any one of the plurality of optical cavities and transmit the reflected pulse. In an example, the system has at least one input fiber coupled to the optical router and a least one output fibers coupled to the optical router.

In an example, the system has a single photon detector device coupled to the optical router. In an example, the optical interconnect is coupled to one or more of a single-photon generator, a photon detector, a network comprising of one or more optical cavities each of which is identical, a single-photon source, a semiconductor single-photon emitter, an optical router, an optical switch, a circulators, a photon detector, a polarization beam splitter, a coherent light source, a squeezed light source, or an optical homodyne and heterodyne detector, among other devices.

In an example, the system is characterized as a repeater cell system configured to encode a one or more photons into an entangled state such that the entangled state comprises a logical state such that a photon loss can be detected and corrected to preserve a logical qudit information. In an example, the system is configured to entangle a state of one or more encoded photons with one or more states of the qubits in the one or more optical cavities. In an example, the system is configured to relay a quantum information transmitted using one or more photons to a neighboring repeater cell system by an entanglement swapping operation or measurement and re-encoding of an incoming photonic encoded qudit information.

Further details of the system can be found in commonly owned patent applications described in U.S. patent application Ser. No. 18/347,121, filed on Jul. 5, 2023, commonly assigned, and hereby incorporated by reference herein. Other applications describe various aspects of components are described in U.S. patent application Ser. No. 18/325,901, filed on May 30, 2023, and Ser. No. 18/347,174, filed on Jul. 5, 2023, each of which is commonly assigned, and hereby incorporated by reference herein.

REFERENCES

[1] D. Gottesman et al., Phys. Rev. A 64, 012310 (2001).
[2] J. Hastrup et al., Phys. Rev. Lett. 128, 170503 (2022)
[3] A. L. Grimsmo et al., Phys. Rev. X 10, 011058
[4] E. Knill, Nature 434, 39 (2005).
[5] K. Noh et al., PRX Quantum 3, 010315 (2022)
[6] T. J. Bell et al., PRX Quantum 4, 020328 (2023)
[7] K. J. Wo et al., npj Quantum Info. 9, 123 (2023)

While the above is a full description of the specific examples, various modifications, alternative constructions, and equivalents may be used. As an example, the device can include any combination of elements described above, as well as outside of the present specification. Additionally, the terms first, second, third. and final do not imply order in one or more of the present examples. Therefore, the above description and illustrations should not be taken as limiting the scope of the present invention which is defined by the appended claims.

The invention claimed is:

1. A quantum communication system, the system comprising:
   a light source configured to generate a pulse of light;
   a plurality of optical cavities, each of the optical cavities having:
      at least a pair of optical mirrors each characterized by a mirror reflectivity >99% and having reflecting surfaces facing each other to form a cavity, the cavity having a length ranging from 1 micrometer to 1 centimeter; and
      a plurality of qubits comprising a laser coolable atom, ion, nitrogen vacancy center, or silicon color center, such that a number of the qubits range from two to 100,000;
   an interconnect coupled to each cavity;

an optical router coupled to the light source and coupled to each of the cavities through the interconnect, the optical router configured to transmit the pulse of light to any one of the plurality of optical cavities and receive a reflected pulse of light from any one of the plurality of optical cavities, and subsequently transmit the reflected pulse; and a beam splitter coupled to the optical router to receive the reflected light and configured to output the reflected light to an output port.

2. The system of claim 1 wherein the beam splitter is configured to receive a generated pulse of light to displace a phase space distribution of the pulse of light generated by the light source.

3. The system of claim 1 wherein each of the plurality of optical cavities further comprises a plurality of electrical coil pairs to control a magnetic field and magnetic field gradient at locations of the qubits and a detection system operably coupled to a cavity region configured to collect one or more fluorescence photons to be sent to a camera or a detector with a quantum efficiency of 0.1 or higher.

4. The system of claim 3 further comprising a computing system comprising an information processing unit configured to process a recorded qubit state information captured from the camera or the detector and configured to identify a quantum state of the qubits.

5. The system of claim 4 wherein the computing system is configured to decode using the information processing unit a quantum error information from measurement results.

6. The system of claim 1 wherein the pair of optical mirrors is selected from a free-space bulk mirror, a fiber-based mirror, or a fiber Bragg grating mirrors.

7. The system of claim 1 wherein one or more qubits are coupled to a cavity mode between the two free-space bulk mirrors or a fiber-based mirrors.

8. The system of claim 1 wherein one or more qubits are evanescently coupled to a cavity mode between the two optical mirrors at a nanofiber region, the nanofiber region configured from a portion of a fiber optic cable and coupled between a first fiber Bragg grating mirror and a second fiber Bragg grating mirror, the nanofiber region having a transmission of ≥99%, the nanofiber region having a diameter ranging from 300 nanometers to 1.5 micrometer, and the nanofiber region ranging from 10 micrometers to 10 centimeters in length.

9. The system of claim 1 wherein the interconnect is coupled to one or more of a single-photon generator, a photon detector, a network comprising of one or more optical cavities each of which is identical, a single-photon source, a semiconductor single-photon emitter, an optical router, an optical switch, circulators, a polarization beam splitter, a coherent light source, a squeezed light source, or an optical homodyne and heterodyne detector.

10. The system of claim 1 further comprising a communication input port coupled to the optical router.

11. The system of claim 1 further comprising a communication output port coupled to a feedforward displacement operation such that a communication output light pulse represents a same encoded state of a light pulse received at the communication input port with a reduced error.

12. A quantum communication system, the system comprising:

a light source configured to generate a pulse of light;

a plurality of optical cavities, each of the optical cavities having:

at least a pair of optical mirrors each characterized by a mirror reflectivity >99% and having reflecting surfaces facing each other to form a cavity, the cavity having a length ranging from 1 micrometer to 1 centimeter; and a plurality of qubits comprising a laser coolable atom, ion, nitrogen vacancy center, or silicon color center, such that a number of the qubits range from two to 100,000;

an interconnect coupled to each cavity;

an optical router coupled to the light source and coupled to each of the cavities through the interconnect, the optical router configured to transmit the pulse of light to any one of the plurality of optical cavities and receive a reflected pulse of light from any one of the plurality of optical cavities, and subsequently transmit the reflected pulse;

at least one input fiber coupled to the optical router; and at least one output fiber coupled to the optical router.

13. The system of claim 12 further comprising a single photon detector device coupled to the optical router.

14. The system of claim 12 wherein the optical interconnect is coupled to one or more of a single-photon generator, a photon detector, a network comprising of one or more optical cavities each of which is identical, a single-photon source, a semiconductor single-photon emitter, an optical router, an optical switch, circulators, a polarization beam splitter, a coherent light source, a squeezed light source, or an optical homodyne and heterodyne detector.

15. The system claim 12 wherein the system is characterized as a repeater cell system configured to encode one or more photons into an entangled state such that the entangled state comprises a logical state such that a photon loss can be detected and corrected to preserve a logical qudit information.

16. The system of claim 12 wherein the system is configured to entangle a state of one or more encoded photons with one or more states of the qubits in the optical cavities.

17. The system of claim 12 wherein the system is configured to relay quantum information transmitted using one or more photons to a neighboring repeater cell system by an entanglement swapping operation or measurement and re-encoding of an incoming photonic encoded qudit information.

\* \* \* \* \*